United States Patent [19]

Pieren et al.

[11] 4,112,288

[45] Sep. 5, 1978

[54] ORIFICE TIP

[75] Inventors: William R. Pieren; Robert F. Stetson, both of San Diego, Calif.

[73] Assignee: General Atomic Company, San Diego, Calif.

[21] Appl. No.: 569,068

[22] Filed: Apr. 17, 1975

[51] Int. Cl.² ............................................. B23K 9/00
[52] U.S. Cl. ................................. 219/121 P; 219/75
[58] Field of Search ............ 219/121 P, 74, 75; 313/231.3, 231.4, 231.5; 423/448; 427/34

[56] References Cited

U.S. PATENT DOCUMENTS

| | | | |
|---|---|---|---|
| 2,900,485 | 8/1959 | Clark | 219/75 |
| 3,324,333 | 6/1967 | Hahn | 219/75 |
| 3,619,286 | 11/1971 | Gutnajer | 423/448 X |
| 3,664,859 | 5/1972 | Beatty et al. | 423/448 X |
| 3,708,451 | 1/1973 | McWhorter et al. | 423/448 X |
| 3,718,720 | 2/1973 | Lambdin, Jr. et al. | 423/448 X |
| 3,787,541 | 1/1974 | Grindstaff et al. | 423/448 X |
| 3,812,240 | 5/1974 | Whittaker et al. | 423/448 |
| 3,914,392 | 10/1975 | Klett | 423/448 X |
| 3,927,187 | 12/1975 | Luhleich et al. | 423/448 |

Primary Examiner—J. V. Truhe
Assistant Examiner—Clifford C. Shaw
Attorney, Agent, or Firm—Fitch, Even, Tabin & Luedeka

[57] ABSTRACT

An orifice tip for a plasma arc welding and cutting torch is described wherein the tip is comprised of an isotropic graphite of substantially uniform thermal conductivity and with a very small particle and pore size, thereby providing substantially superior operating life.

3 Claims, 3 Drawing Figures

ORIFICE TIP

This invention relates to plasma arc welding and cutting torches. More particularly, the invention relates to an improved orifice tip for such a torch which provides substantially longer life than presently commercially available orifice tips.

A plasma arc welding or cutting torch utilizes a process whereby heat is produced by a constricted arc between a non-consumable electrode of tungsten or other suitable material and the work piece. The arc is constricted by means of a gas envelope produced by passing a suitable inert gas such as argon through an orifice tip surrounding the electrode coaxially therewith. As a result, a jet of intensely hot and fast moving plasma is formed. In order to prevent the molten weld metal and the arc from becoming contaminated by the surrounding air atmosphere, a second stream of gas is passed between the outside of the orifice tip and an outer shielding cup. The shielding gas may be comprised of any suitable element or elements such as a combination of 5% hydrogen and 95% argon.

During operation of a typical plasma arc welding and cutting torch, some arcing may occur between the electrode and the area within the orifice tip near the outside face of the tip. Orifice tips made according to present commercial practices suffer erosion due to this arcing as well as due to the intense heat generated by the plasma arc. Because the size and shape of the constricted column of plasma gas is an important process parameter, and because the size and shape of this constricted column is affected by the change in shape of the orifice tip due to erosion, an important process parameter change may result. This means that the orifice tip must be replaced. Tip deterioration is an even more serious problem in connection with very small torches where water cooling is less effective.

It is an object of the present invention to provide an improved orifice tip for a plasma arc welding and cutting torch.

Another object of the invention is to provide an orifice tip having substantially longer operating life than commercially available orifice tips.

A further object of the invention is to provide an orifice tip which is not as susceptible to erosion as a result of arcing or high temperatures.

Other objects of the invention will become apparent to those skilled in the art from the following description, taken in connection with the accompanying drawings wherein.

Very generally, the orifice tip of the invention comprises an isotropic graphite of substantially uniform thermal conductivity having an average particle size less than about 0.003 inch diameter and an average pore size less than about 1 micron.

Figure 1:
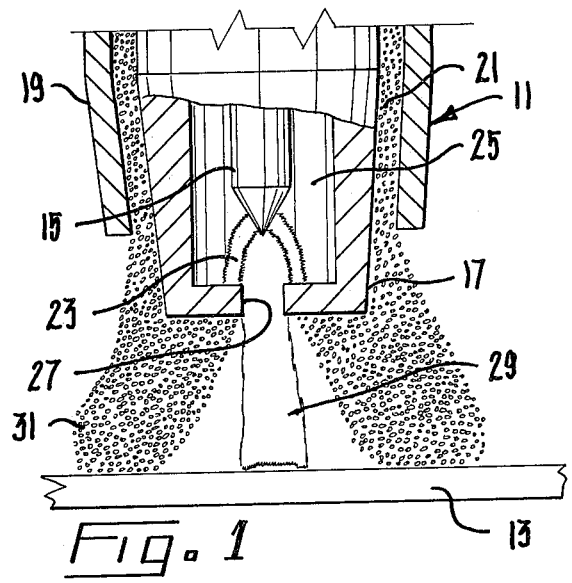
FIG. 1 is a schematic view of the end of a plasma arc welding and cutting torch illustrating the process as it occurs in connection with a substantially uneroded orifice tip.

Referring now to FIG. 1, the end of a plasma welding torch 11 is shown schematically in the process of welding a work piece 13. The torch includes an electrode 15 disposed coaxially with an orifice tip 17. An outer shield cup 19 surrounds the orifice tip forming an annulus 21. An arc 23 is established between the electrode and the orifice tip and an orifice gas is fed into the space 25 between the orifice tip and the electrode. This results in the formation of a plasma 29 of a very high temperature which is forced in a stream through an opening 27 in the orifice tip to the work piece 13. A shielding gas is passed through the annulus 21 and surrounds the plasma as indicated at 31.

In FIG. 1, the orifice tip is of the proper shape, and the shape of the plasma is substantially columnar and extends coaxially from the electrode 15.

Figure 2:
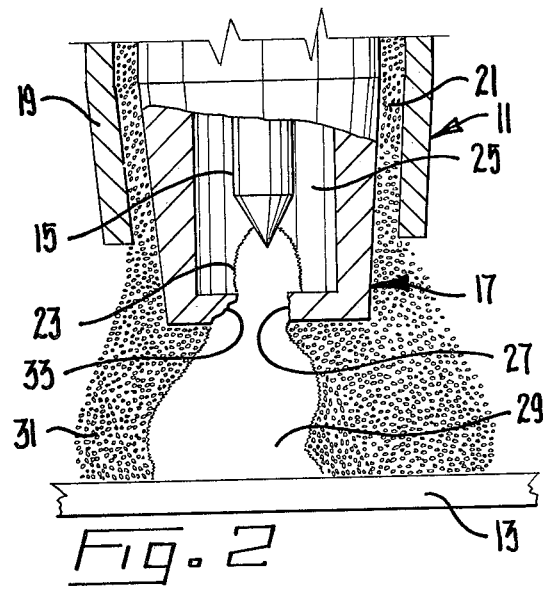
FIG. 2 is a schematic view similar to FIG. 1 illustrating how erosion of the orifice tip can cause deterioration of the process.

Referring to FIG. 2, an operating condition is shown typical of that which occurs when the orifice tip erodes. The orifice tip 17 is shown eroded at the opening 27 in the region indicated at 33. As may be seen, the effect of the erosion is to distort the column of the plasma gas and spread it out as illustrated. This causes a significant change in the welding process parameters and typically necessitates replacement of the orifice tip. Naturally, the frequency of such replacement can add to the expense and the time required in the welding process.

In accordance with the invention, the orifice tip of the plasma arc welding and cutting torch is comprised of an isotropic graphite of substantially uniform thermal conductivity. The graphite has a small pore size and small particle size, a low coefficient of thermal expansion, good electrical resistivity and a sharp minimum radius of machineability.

The uniform thermal conductivity assists in distributing the heat load in the orifice tip. Thus, localized hot spots do not occur which might contribute to the deterioration of the orifice tip in that particular region.

Preferably, the particle size of the graphite is less than about 0.003 inch in average diameter. A preferred average diameter is approximately 0.001 inch. At this particle size, a shape minimum radius machineability results to ensure accurate dimensions and shape in the orifice tip.

As is known, pores are inherent in many graphite structures. For proper operation, the orifice tip of the invention should have a pore size of less than about 1 micron. Preferably, the pore size is an average of about 0.4 micron. By utilizing a small pore size, the likelihood of attack by erosion is minimized.

The coefficient of thermal expansion and the electrical resistivity should both be as low as possible. The coefficient of thermal expansion should be less than about $5 \times 10^{-6}$ inch per degree Fahrenheit and is preferably about $4.6 \times 10^{-6}$ inch per degree Fahrenheit. The electrical resistivity should be less than about $1 \times 10^{-3}$ ohm/inch at 70° F. and is preferably about $0.7 \times 10^{-3}$ ohm/inch at 70° F.

A material possessing the preferred properties mentioned above is a grade designated by the manufacturer as POCO AXF5Q and is obtainable from POCO Graphite Company, Decatur, Texas. This material may be used successfully as a material for plasma arc welding and cutting torch orifice tips in accordance with the invention. Orifice tips made from such material are capable of withstanding high temperatures produced by the plasma gas and may be manufactured in the same design as commercially available orifice tips which are typically made out of copper material.

Figure 3:
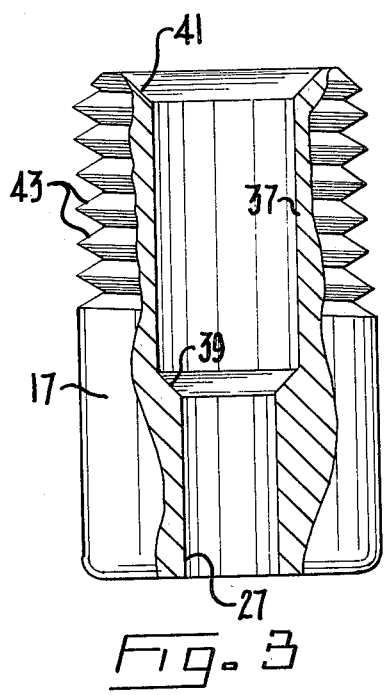
FIG. 3 is a full section view of an orifice tip constructed in accordance with the invention.

FIG. 3 shows the specific structural details of an orifice tip constructed in accordance with the invention. It may be seen that the tip 17 is provided with the opening 27 at one end connected with a slightly larger interior opening 37 by a drill taper section 39. The exterior end of the opening 37 is a countersunk at 41 and the exterior surface of the orifice tip 17 is provided with threads 43 to enable connecting the orifice tip to a suitable mounting sleeve, not shown, of the torch 11. The material of which the orifice tip of FIG. 1 is constructed comprises an isotropic graphite having the properties described above.

The orifice tip of the invention makes it possible to maintain a suitable columnar shape to the column of plasma gas exiting from the torch. This assists in producing non-varying welding or cutting results for a much longer tip life than that possible with prior art orifice tips. The tip of the invention is many times more dependable than commercially available orifice tips.

Various modifications of the invention in addition to those shown and described herein will become apparent to those skilled in the art from the foregoing description and accompanying drawings. Such modifications are intended to fall within the scope of the appended claims.

What is claimed is:

1. In a plasma arc torch having an orifice tip, the improvement in said tip comprising a substantially cylindrical rod-like member having an interior axial passage, an integral portion of said cylindrical member forming an electrode for development of said arc and also forming a passage for communication of plasma developed by said arc away from said welding and cutting torch, said member being formed from an isotropic graphite of substantially uniform thermal conductivity in the longitudinal and transverse directions of the axial passage and having an average particle grain size of less than about 0.003 inches and an average pore size of less than about 1 micron and providing a good machinable graphite for forming said passage, the isotropic graphite forming said cylindrical member having selected qualities of a coefficient of thermal expansion in the range of about $4.6 \times 10^{-6}$ to about $5 \times 10^{-6}$ per degree Fahrenheit and a good electrical resistivity in the range of about $0.7 \times 10^{-3}$ ohm inches to $1 \times 10^{-3}$ ohm inches at 70° F.

2. The improvement of claim 1 wherein the orifice tip is comprised of an isotropic graphite having an average particle size of about 0.001 inch diameter and a pore size of about 0.4 micron.

3. The improvement of claim 1 wherein the orifice tip is comprised of an isotropic graphite having a coefficient of thermal expansion of about $4.6 \times 10^{-6}$ inches per inch per degree Fahrenheit and an electrical resistivity of about $0.7 \times 10^{-3}$ ohm/inch at 70° F.

* * * * *

UNITED STATES PATENT AND TRADEMARK OFFICE
CERTIFICATE OF CORRECTION

PATENT NO. : 4,112,288

DATED : September 5, 1978

INVENTOR(S) : William R. Pieren and Robert F. Stetson

It is certified that error appears in the above-identified patent and that said Letters Patent are hereby corrected as shown below:

Column 2, line 38, change "shape" to --sharp--.

Signed and Sealed this

First Day of May 1979

[SEAL]

Attest:

RUTH C. MASON
Attesting Officer

DONALD W. BANNER
Commissioner of Patents and Trademarks